Nov. 24, 1970  W. SCHMIDT  3,543,069

STRESS-REDUCED COOLING FIN ASSEMBLY FOR A POWER KLYSTRON

Filed April 15, 1968

INVENTOR.
WOLFGANG SCHMIDT
BY
Frank R. Trifiani
AGENT

United States Patent Office 3,543,069
Patented Nov. 24, 1970

3,543,069
STRESS-REDUCED COOLING FIN ASSEMBLY FOR A POWER KLYSTRON
Wolfgang Schmidt, Hamburg-Othmarschen, Germany, assignor, by mesne assignments, to U.S. Philips Corporation, New York, N.Y., a corporation of Delaware
Filed Apr. 15, 1968, Ser. No. 721,489
Claims priority, application Germany, June 29, 1967, P 42,490
Int. Cl. F28f *1/30;* H01j *1/42*
U.S. Cl. 313—30                                    2 Claims

ABSTRACT OF THE DISCLOSURE

A cooling fin assembly for a power klystron in which a plurality of notched plates are threaded on the collector of the klystron in such a way that the facing edges of the notches of adjacent plates form angularly displaced slots around the circumference of the collector.

---

Figure 1:
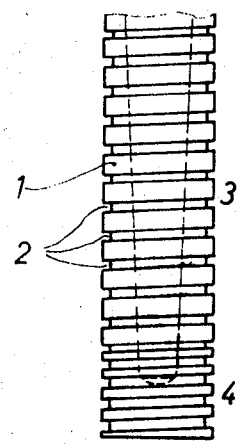

The invention relates to an air-cooled collector for a power klystron in which the air cooling is directed at right angles to the axis of the collector between cooling plates screwed onto the collector, each cooling plate having a continuous recess which extends from its inner side to its outer side, the recesses of the individual cooling plate being arranged one behind the other in such manner that in the assembled condition the radial edges of the recesses of the adjacent cooling plates are located opposite to each other and the recesses together form a slot.

For air-cooled collectors of a power klystron it is no longer possible to simply slide the individual cooling plates on the collector and to hold them in place by soldering, because considerably better heat transmissions are necessary. For this purpose it is known to provide the outer circumference of the collector with a slot-like screwthread in which the individual cooling plates are screwed. In order to enable each plate to expand as a result of heating of the collector, each plate comprises a radial slot and in order to prevent the plates from becoming inclined relative to the collector, they are screwed in such manner that the radial edges of the slots of adjacent cooling plates are always opposite to each other. So each plate extends over 360° of circumference of the collector and the radial edges of the slot of each individual cooling plate are shifted relative to each other by one pitch. In the assembled condition of such a device the slots and the radial edges thereof, respectively, are all located opposite each other. However, such a device enables a preferred expansion of the collector to the side where said slots are located. It has now been found that in the case of high loads cracks may be formed exactly on said side of the collector in the axial direction, so parallel to the slots, which cracks ultimately continue in the radial direction to the inner surface of the collector and hence lead to destruction of the tube.

It is the object of the invention to avoid said formation of cracks which results in destruction of the tube. The solution to this problem may not show any other drawbacks. After it has been found that the formation of cracks was caused by the unilateral provision of the recesses, a solution might be feasible in which, with the omission of the screw thread, the plates are in the form, for example, of annuli and to simply turn the slots relative to each other in assembling so that the collector during operation expands in a different manner. However, such a measure is not permissible for power klystrons because the power is reduced very considerably as a result. So a solution had to be found in which the cooling plates can be screwed on the collector, a very good thermal contact being maintained.

A solution as is known from French patent specification 976,232 could not be used because said device shows a simple tube with a cylindrical smooth anode on which the cooling plates are slid. In order to secure said cooling plates they comprise sector-like recesses. In order to fix the mutual distance of the cooling plates, the sides of the sectors and, on the opposite side, circle sections are bent upwards at their outer edge thus forming spacing members at right angles to the cooling plates which spacing members determine the distance to the adjacent cooling plate and owing to their shape simultaneously determine the direction in which the supplied air can flow away. Such a device is not suitable for power klystrons because the thermal contact between the cooling plates and the outer circumference of the anode is insufficient. In addition, in large power klystron units, a spacing member which consists only of upwardly-bent plate edges is no longer economically constructable because the cooling plates have a considerable wall thickness. From FIG. 4 of this known patent specification a shape of a cooling plate is known which comprises no radial slot. From this, too, it is obvious that the requirements imposed upon such cooling plates for tubes are quite different from the requirements imposed upon cooling plates for power klystrons. So the invention could not start from this prior art. In order to improve the above-mentioned air-cooled collectors with the screwed cooling plates and to avoid the formation of cracks in the collectors, an air-cooled collector of the type mentioned in the preamble is characterized according to the invention, in that each cooling plate has such a sector-like recess that in the assembled condition the adjacent slots are shifted relative to each other over the circumference. The recess of each cooling plate may extend over approximately 45°. As a result of this all the advantages of the so far known device for power klystrons are maintained and only the drawback exists that a large number of plates has to be screwed one after the other. This number depends upon the data of the power klystron, that is to say, by differently large sector-like recesses the extent of shift of the slots relative to each other may be varied for each individual plate. The greatest freedom consists no doubt, in a circular construction of the cooling plates, that is to say of cooling plates which also have a circular outer circumference. If the outer circumference is to be angular, certain requirements have to be fulfilled which, however, is possible in accordance to the invention. For example, it serves of no use when the sector-like recesses extend over 180° because in that case the slots are located over each other again. So the recesses have to extend over less than 180°. Because, however, it is of advantage to use a plate which is as large as possible, recesses are to be preferred which are smaller than 90°. A particularly advantageous value, as already mentioned above, is approximately 45°.

Figure 2:
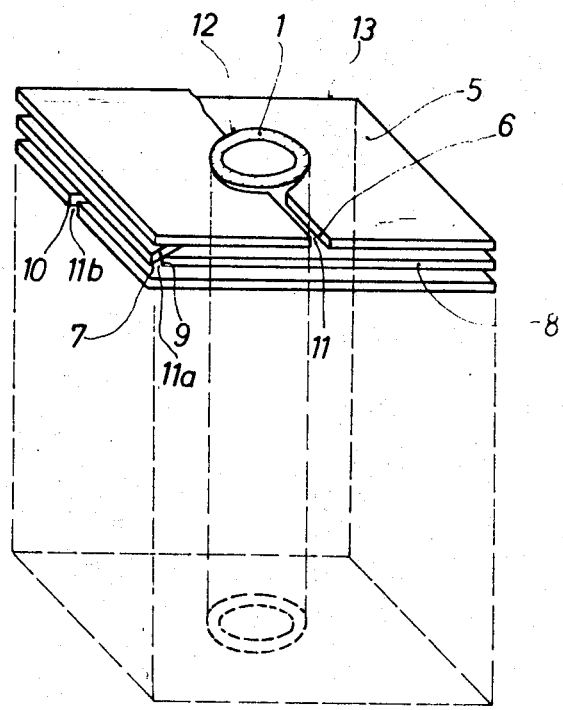
Figure 3:
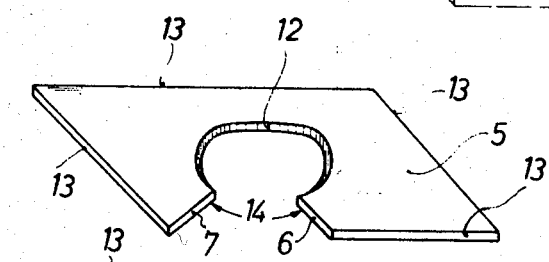
Figure 4:
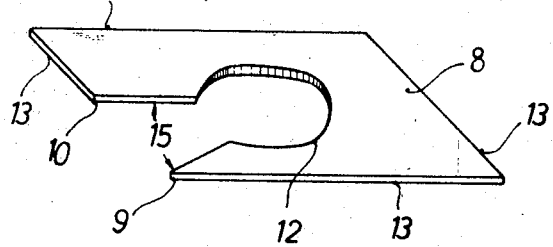

In order that the invention may be readily carried into effect, one embodiment thereof will now be described in greater detail, by way of example, with reference to the accompanying drawing, in which FIG. 1 shows a collector for a power klystron having a slot-like screw thread on the outer circumference, FIG. 2 shows cooling plates according to the invention in the assembled condition, FIG. 3 shows a cooling plate according to the invention, FIG. 4 shows a cooling plate according to the invention which has to be provided next to that of FIG. 3.

Referring now to FIG. 1, reference numeral 1 denotes the collector which comprises grooves 2 on its outer surface which form a screw thread with a rectangular cross-section. As shown at 3, said grooves may have a rather large mutual distance or, as shown at 4, be located so near to each other that the groove width is equal to the pitch width remaining between the grooves 2.

FIG. 2 shows the collector 1 with screwed cooling plates, only a few of which are shown. A cooling plate 5 comprises a radial edge 6 which constitutes a slot 11 with the radial edge of the recess of the cooling plate located above it. The other edge of the cooling plate 5 which likewise extends radially, is denoted by 7. The underlying cooling plate bears reference numeral 8. It adjoins the cooling plate 5 and its one radial edge 9 is located opposite to the edge 7 of the cooling plate 5. Between the sides 7 and 9 a slot 11a is formed which is shifted 45° relative to the slot 11. The plate 8 is terminated by an edge 10 which constitutes a slot 11b together with the edge of the next adjacent cooling plate, which slot is shifted 45° relative to the slot 11a.

For explanation the FIGS. 3 and 4 show the two cooling plates 5 and 8. As shown in these figures, the edges 6 and 7 of the cooling plate 5 are shifted 45° so that a sector-like recess 14 is formed. The edges 9 and 10 of the cooling plate 8 are likewise shifted 45° so that on screwing on the collector, the edge 7 of the cooling plate 5 becomes located opposite to the edge 9 of the cooling plate 8 and in between them the slot 11 is formed as is shown in FIG. 2. The inner sides of the cooling plates 5 and 8 are denoted by 12 and the outer sides by 13. By such sector-like recesses 14 and 15 it is achieved that the cooling plates 5 and 8 can be screwed on the collector 1, as in the known devices, but that on the contrary the slots 11, 11a and 11b are located at different places of the outer circumference of the collector 1. They are thus shifted relative to each other and extend approximately helically about the collector 1 so that the forces, on expansion of the collector 1, are distributed over the whole circumference of the collector and any formation of axial cracks is avoided.

What is claimed is:

1. A cooling assembly for a power klystron comprising a cylindrical collector, and a plurality of plates each having a hole near the center thereof of substantially the diameter of said cylindrical collector, and each plate having a sector-shaped recess extending radially from the hole to the edge of each plate, each plate being positioned around the cylindrical collector surface and each plate being so positioned with respect to the adjacent plates that an edge of a recess of one plate faces the corresponding opposite edge of a recess in an adjacent plate and forms therewith a slot, and wherein the slots are angularly displaced from each other over the circumference of the collector.

2. An air-cooled collector as claimed in claim 1, wherein the recess of each cooling plate extends over approximately 45°.

References Cited

UNITED STATES PATENTS

| 2,036,417 | 4/1936 | Laird | 165—184 X |
| 2,460,024 | 1/1949 | McKee | 165—184 X |
| 3,251,410 | 5/1966 | Raskin | 165—181 |

JAMES W. LAWRENCE, Primary Examiner

E. R. LA ROCHE, Assistant Examiner

U.S. Cl. X.R.

29—157.3; 165—81, 184; 313—45